(12) United States Patent
Jeong et al.

(10) Patent No.: US 10,903,666 B2
(45) Date of Patent: Jan. 26, 2021

(54) BATTERY CHARGING METHOD AND APPARATUS

(71) Applicant: Samsung Electronics Co., Ltd., Suwon-si (KR)

(72) Inventors: Ji-Young Jeong, Hwaseong-si (KR); Young Hun Sung, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 336 days.

(21) Appl. No.: 15/941,477

(22) Filed: Mar. 30, 2018

(65) Prior Publication Data

US 2019/0148954 A1 May 16, 2019

(30) Foreign Application Priority Data

Nov. 15, 2017 (KR) .................. 10-2017-0152557

(51) Int. Cl.
*H02J 7/00* (2006.01)
*H01M 10/44* (2006.01)
*B60L 58/12* (2019.01)
*B60L 58/21* (2019.01)

(52) U.S. Cl.
CPC .......... *H02J 7/0021* (2013.01); *H01M 10/44* (2013.01); *H02J 7/0013* (2013.01); *B60L 58/12* (2019.02); *B60L 58/21* (2019.02); *H02J 2207/40* (2020.01)

(58) Field of Classification Search
CPC ....... Y02E 60/12; H02J 7/0004; H02J 7/0006; H01M 10/48; H01M 10/4257
See application file for complete search history.

(56) References Cited

U.S. PATENT DOCUMENTS

| 8,582,319 | B2 | 11/2013 | Reinberger et al. | |
|---|---|---|---|---|
| 2008/0136372 | A1* | 6/2008 | Eto | H01M 10/46 |
| | | | | 320/114 |
| 2009/0212626 | A1* | 8/2009 | Snyder | B60L 50/61 |
| | | | | 307/10.1 |
| 2014/0009120 | A1* | 1/2014 | Kim | H02J 7/0068 |
| | | | | 320/138 |
| 2015/0180255 | A1* | 6/2015 | Kim | B60L 50/51 |
| | | | | 320/162 |

FOREIGN PATENT DOCUMENTS

| CN | 201594757 U | 9/2010 |
|---|---|---|
| JP | 2010-187467 A | 8/2010 |
| JP | 2013-62978 A | 4/2013 |
| JP | 5524019 B2 | 6/2014 |
| JP | 5567100 B2 | 8/2014 |
| JP | 6065316 B2 | 1/2017 |
| JP | 6160643 B2 | 7/2017 |
| KR | 10-2011-0048444 A | 5/2011 |
| KR | 10-1241670 B1 | 3/2013 |
| KR | 10-1751236 B1 | 6/2017 |

\* cited by examiner

*Primary Examiner* — Arun C Williams
(74) *Attorney, Agent, or Firm* — NSIP Law

(57) ABSTRACT

A battery charging method and apparatus are provided. The battery charging method includes determining a number of charging ports to charge a battery based on a determined state of the battery, and charging the battery using the number of charging ports.

18 Claims, 7 Drawing Sheets

BATTERY CHARGING METHOD AND APPARATUS

CROSS-REFERENCE TO RELATED APPLICATIONS

This application claims the benefit under 35 USC § 119(a) of Korean Patent Application No. 10-2017-0152557, filed on Nov. 15, 2017, in the Korean Intellectual Property Office, the entire disclosure of which is incorporated herein by reference for all purposes.

BACKGROUND

1. Field

The following description relates to a battery charging method and apparatus.

2. Description of Related Art

A battery is used as a power source of an electric vehicle (EV) or a mobile device, and battery cells included in the battery are connected in series or in parallel and are charged with current supplied via a single path. Also, fast charging may be used to reduce the time required to charge a battery mainly using charging algorithms.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a battery charging method includes determining a number of charging ports to charge a battery based on a determined state of the battery, and charging the battery using the number of charging ports.

In response to the number of charging ports being determined to be a plural number of charging ports, the battery may be divided into a number of battery sections equal to the plural number of charging ports. The battery sections may be connected to corresponding plural number of charging ports to charge the battery.

In response to the number of charging ports being determined to be only a single charging port, the battery may be charged using the single charging port in a state in which the battery is not divided into battery sections.

The determining of the number of charging ports may include determining whether fast charging of the battery is appropriate based on the determined state of the battery. In response to the fast charging being determined to be appropriate, a plural number of charging ports may be determined to be used. In response to the fast charging being determined to be inappropriate, determining to use only a single charging port to charge the battery.

The determined state of the battery may include any one or any combination of any two or more of a state of charge (SOC), a state of health (SOH), and a temperature of the battery.

The determining of the number of charging ports may include: in response to a charging state of the battery being determined to be less than a threshold charging state, determining to use a plural number of charging ports to charge the battery; and in response to the charging state of the battery being determined to be greater than or equal to the threshold charging state, determining to use only a single charging port to charge the battery.

The determining of the number of charging ports may include: in response to a state of life of the battery being determined to be greater than or equal to a threshold state of life, determining to use a plural number of charging ports to charge the battery; and in response to the state of life of the battery being determined to be less than the threshold state of life, determining to use only a single charging port to charge the battery.

The determining of the number of charging ports may include: in response to a temperature of the battery being determined to be greater than or equal to a threshold temperature, determining to use a plural number of charging ports to charge the battery; and in response to the temperature of the battery being determined to be less than the threshold temperature, determining to use only a single charging port to charge the battery.

The determining of the number of charging ports may include: sensing a number of available charging ports connected to an external power source among charging ports used to charge the battery; and in response to the sensed number of available charging ports being determined to be different from the number of charging ports determined based on the determined state of the battery, changing the sensed available number of charging ports to be equal to the number of charging ports determined based on the determined state of the battery to charge the battery.

The charging of the battery may include: in response to the number charging ports being determined to be a plural number of charging ports, fast charging the battery using the plural number of charging ports; and in response to the number of charging ports being determined to be a single charging port, slowly charging the battery using the single charging port.

The battery may include a plurality of battery modules, and the plurality of battery modules may be selectively connected to or disconnected from each other based on the determined number of charging ports.

The charging of the battery may include: charging the battery with either one or both of a charging voltage and a charging current that are determined based on any one or any combination of any two or more of the determined number of charging ports, an external power source to charge the battery, and a rated input of the battery.

In a general aspect, provided is a non-transitory computer-readable storage medium that stores instructions that, when executed by a processor, causes the processor to perform any or all operations of the battery charging methods described herein.

In another general aspect, a battery charging apparatus includes: a processor; and a memory including at least one instruction that is executable by the processor. In response to the at least one instruction being executed by the processor, the processor is configured to: determine a number of charging ports to charge a battery based on a determined state of the battery; and charge the battery using the charging ports.

In response to the number of charging ports being determined to be a plural number of charging ports, the processor may be further configured to: divide the battery into a number of battery sections equal to the plural number of charging ports; connect the battery sections to corresponding charging ports; and charge the battery using the plural number of charging ports.

In response to the number of charging ports being determined to be a single charging port, the processor may be further configured to charge the battery in a state in which the battery is not divided into battery sections.

The processor may be further configured to: determine whether fast charging of the battery is appropriate based on the determined state of the battery; in response to the fast charging being determined to be appropriate, determine to use a plural number of charging ports; and in response to the fast charging being determined to be inappropriate, determine to use only a single charging port.

The determined state of the battery may include any one or any combination of any two or more of a state of charge (SOC), a state of health (SOH), and a temperature of the battery.

The processor may be further configured to: sense a number of charging ports connected to an external power source among charging ports used to charge the battery; and in response to the sensed number of charging ports being determined to be different from the number of charging ports determined based on the determined state of the battery, changing the sensed number of charging ports to equal a number of charging ports used to charge the battery.

The battery may include a plurality of battery modules, and the plurality of battery modules may be connected to or disconnected from each other based on the determined number of charging ports.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
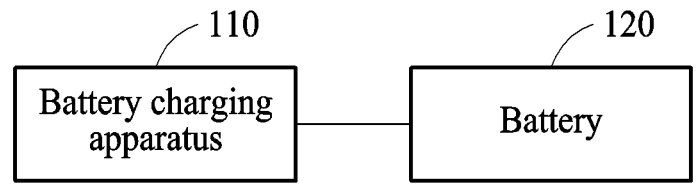
FIG. 1 illustrates an example of a relationship between a battery charging apparatus and a battery.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Although terms of "first" or "second" are used to explain various components, the components are not limited to the terms. These terms should be used only to distinguish one component from another component. For example, a "first" component may be referred to as a "second" component, or similarly, and the "second" component may be referred to as the "first" component within the scope of the right according to the concept of the present disclosure.

It will be understood that when a component is referred to as being "connected to" another component, the component can be directly connected or coupled to the other component or intervening components may be present.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Unless otherwise defined herein, all terms used herein including technical or scientific terms have the same meanings as those generally understood by one of ordinary skill in the art after an understanding of the present disclosure. Terms defined in dictionaries generally used should be construed to have meanings matching with contextual meanings in the related art and the present disclosure and are not to be construed as an ideal or excessively formal meaning unless otherwise defined herein.

The features of the examples described herein may be combined in various ways as will be apparent after an understanding of the disclosure of this application. Further, although the examples described herein have a variety of configurations, other configurations are possible as will be apparent after an understanding of the disclosure of this application.

Hereinafter, examples will be described in detail below with reference to the accompanying drawings, and like reference numerals refer to the like elements throughout.

FIG. 1 illustrates an example of a relationship between a battery charging apparatus 110 and a battery 120.

FIG. 1 illustrates the battery charging apparatus 110 and the battery 120.

The battery 120 is, for example, a battery pack including a plurality of battery modules.

The battery charging apparatus 110 determines a number of charging ports to be used to charge the battery 120 based on the state of the battery 120. For example, the battery charging apparatus 110 determines, based on the state of the battery 120, whether fast charging of the battery 120 is appropriate. Based on the determined result, a determination is made whether to use a plurality of charging ports or a single charging port. In an example, when the fast charging is determined to be appropriate, the battery charging apparatus 110 determines to use the plurality of charging ports. In another example, when the fast charging is determined to be inappropriate, the battery charging apparatus 110 determines to use a single charging port.

The battery charging apparatus 110 charges the battery 120 using the charging ports. In an example, when the plurality of charging ports are determined to be used, the battery charging apparatus 110 divides the battery 120 into the same number of sections as the plurality of charging ports, connects the sections to corresponding charging ports, and fast charges the battery 120. In another example, when a single charging port is determined to be used, the battery charging apparatus 110 slowly charges the battery 120 of a single section, i.e., not divided.

Hereinafter, examples of an operation of the battery charging apparatus 110 will be further described with reference to the accompanying drawings.

Figure 2:
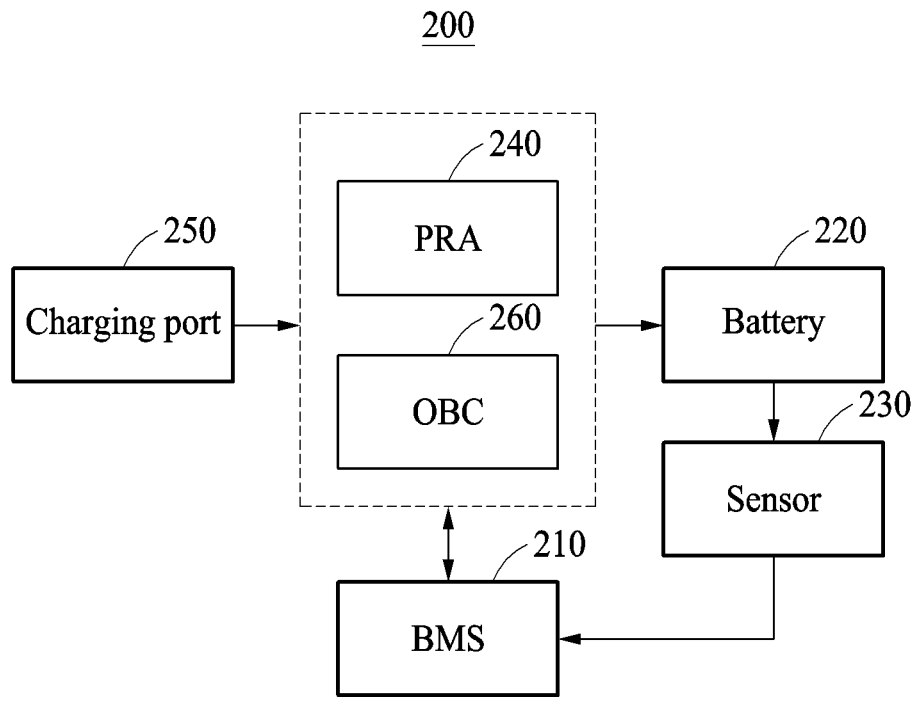
FIG. 2 illustrates an example of a battery system.

FIG. 2 illustrates an example of a battery system 200.

Referring to FIG. 2, the battery system 200 includes a battery management system (BMS) 210, a battery 220, a sensor 230, a power relay assembly (PRA) 240, a charging port 250, and an onboard charger (OBC) 260.

The BMS 210 is a system to manage the battery 220, and includes a battery charging apparatus. The BMS 210 determines a state of the battery 220 based on any one or any combination of any two or more of a voltage, a current, and a temperature of the battery 220 sensed by the sensor 230. For example, the state of the battery 220 includes any one or any combination of any two or more of a state of charge (SOC), a state of health (SOH), and a temperature of the battery 220.

The BMS 210 determines a number of charging ports 250 to be used to charge the battery 220 based on the state of the battery 220, and controls the PRA 240 to charge the battery 220 using the charging ports 250.

The PRA 240 is a device configured to control the switching, on and off, of a plurality of relays to supply or interrupt the power stored in the battery 220. Using the PRA 240, the battery 220 may be divided into a plurality of battery modules or a plurality of battery modules included in the battery 220 may be connected to each other.

The charging port 250 is a device that may be connected to an external power source. When the charging port 250 is connected to the external power source, for example, the battery 220 is charged with power transferred from the external power source. During charging, the battery 220 is connected to at least one of the plurality of charging ports, and is charged with power transferred via the connected charging port 250.

The OBC 260 is a device configured to charge the battery 220 by converting an alternating current (AC) power into a direct current (DC) power. The OBC 260 may operate when the charging port 250 is connected to an AC power source.

Figure 3:
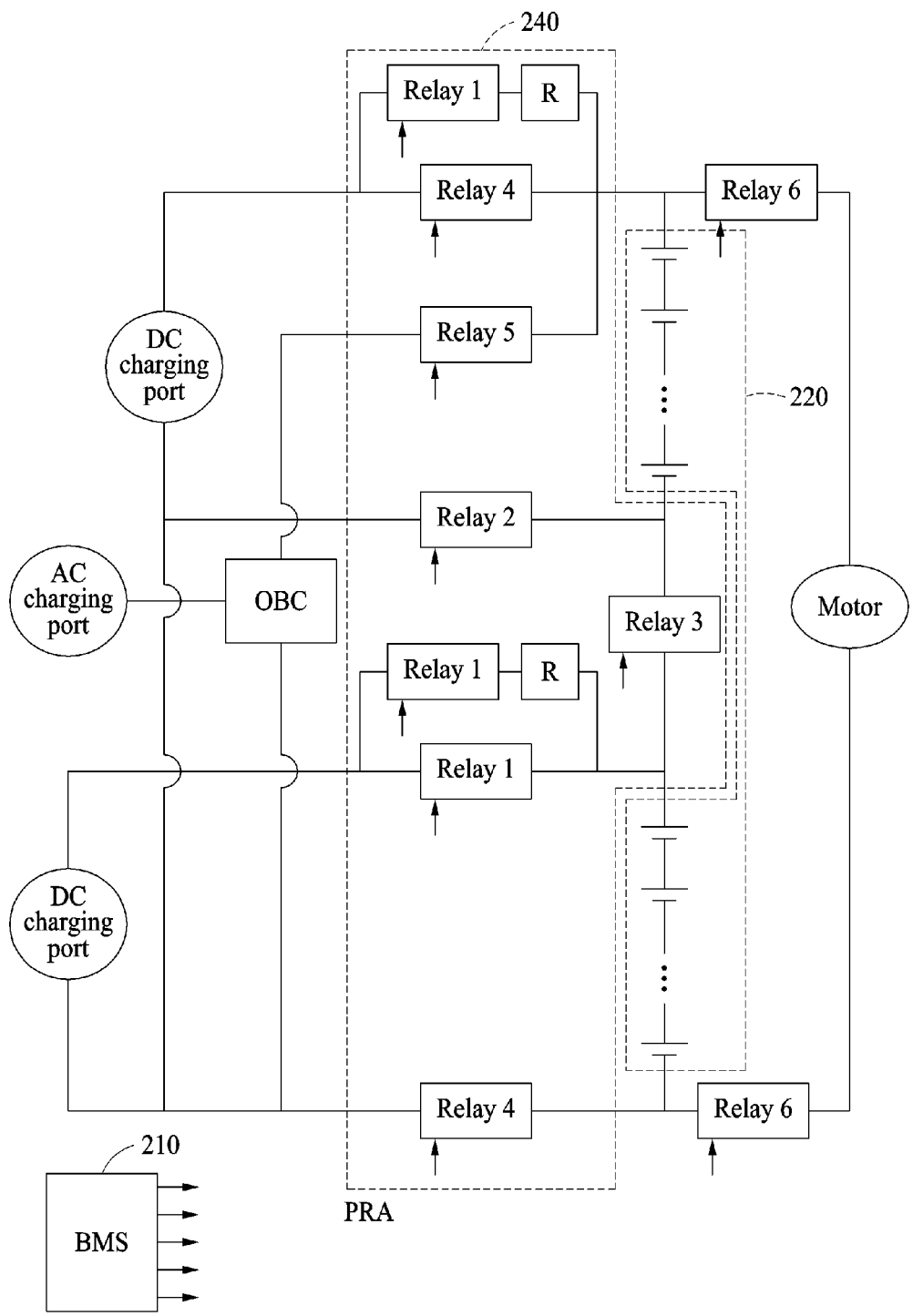
FIG. 3 illustrates an example of a circuit of a battery system.

FIG. 3 illustrates an example of a circuit of a battery system.

Referring to FIG. 3, the BMS 210 controls the switching, on and off, of a plurality of relays using the PRA 240. In FIG. 3, arrows of the BMS 210, showing output connections, and arrows input to the plurality of relays connect the BMS 210 and to the plurality of relays.

The BMS 210 selectively switches, on or off, the plurality of relays to charge the battery using the charging ports. For example, a DC charging port is used to charge the battery 220. The plurality of relays are selectively switched on or off, which connects at least one of the plurality of DC charging ports to the battery 220. The DC charging port may be connected to an external DC power source.

During charging, a relay 6 is switched off, which prevents power being supplied from the battery 220 to a motor. When the motor is controller to operate, the relay 6 is switched on and relays 1 through 5 are switched off causing the motor to receive power from the battery 220, thereby operating the motor.

An AC charging port is a charging port connected to an AC power source. For example, AC power transferred via the AC charging port is converted into DC power in an OBC and used to charge the battery 220, as described above. In this example, the battery 220 is slowly charged.

Figure 4:
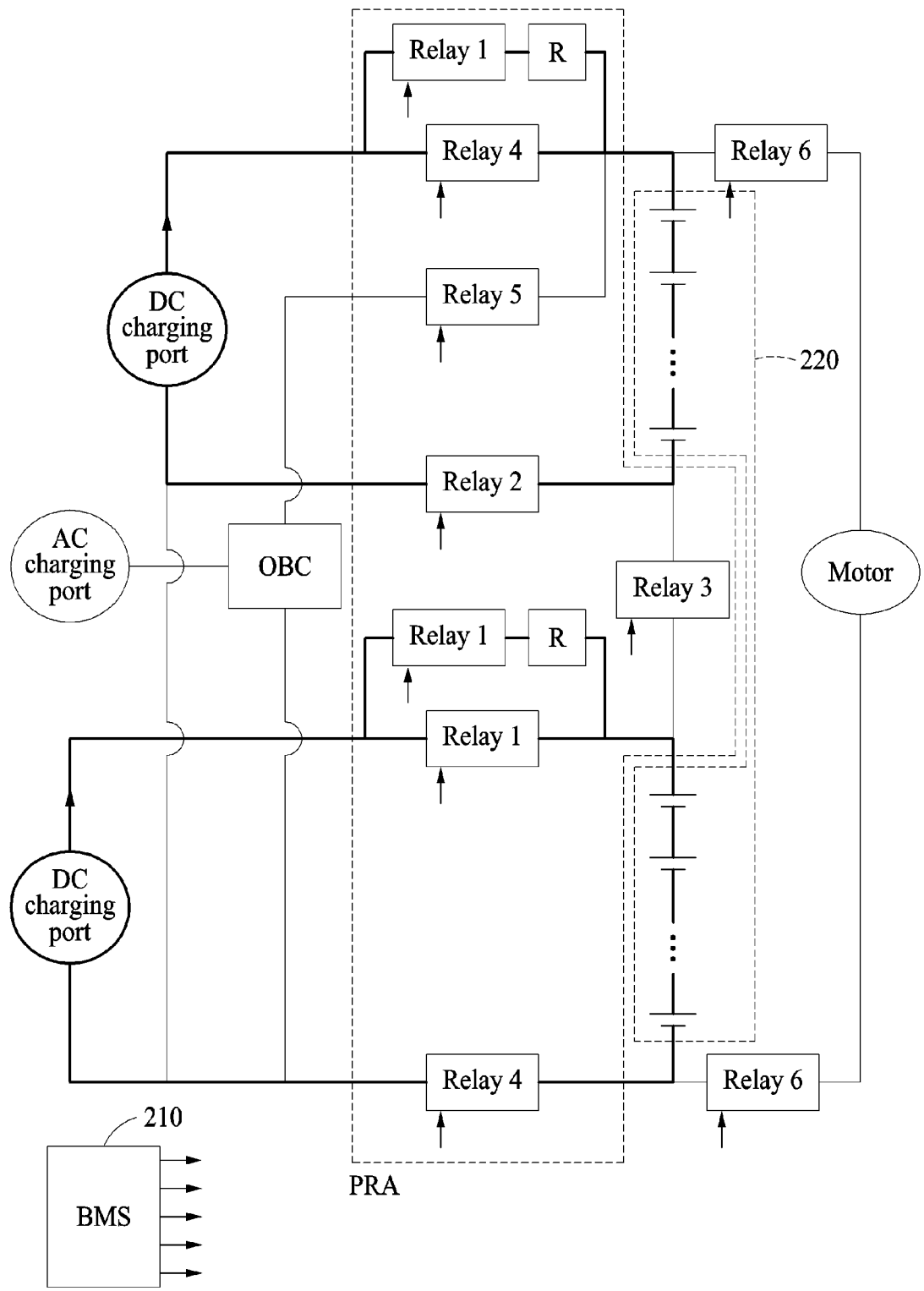
FIG. 4 illustrates an example of a fast charging operation.

FIG. 4 illustrates an example of a fast charging operation.

FIG. 4 illustrates a process of fast charging the battery 220 using a plurality of charging ports.

When a plurality of charging ports are determined to be used to charge the battery 220, the BMS 210 selectively switches, on or off, the plurality of relays based on a control of a PRA. For example, a relay 3 is switched off to divide the battery 220 into two battery sections, and relays 1, 2 and 4 are switched on so that the battery sections of the battery 220 are connected to corresponding DC charging ports. In this example, the AC charging port and the motor are not used, and accordingly relays 5 and 6 are switched off.

In FIG. 4, solid lines represent a closed circuit to which power is supplied from an external DC power source. The closed circuits respectively correspond to sections of the battery 220 that are formed so that each of the sections are charged. Each of the sections of the battery 220 is charged from a separate external power source, and thus it is possible to effectively reduce the charging time and power dissipation due to charging.

Figure 5:
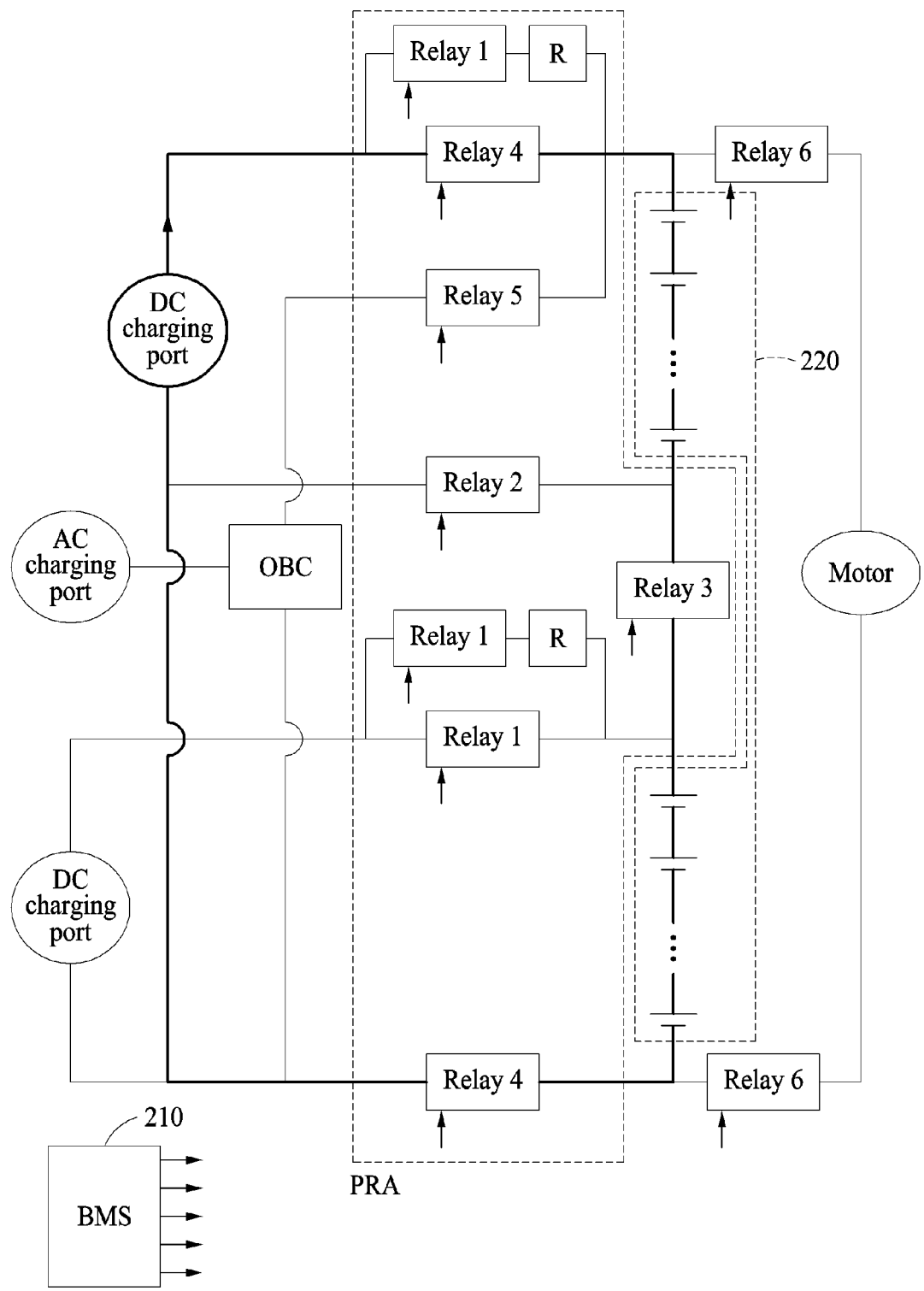
FIG. 5 illustrates an example of a slow charging operation.

FIG. 5 illustrates an example of a slow charging operation.

FIG. 5 illustrates a process of slowly charging the battery 220 using a single charging port.

When a plurality of charging ports are determined to be used to charge the battery 220, the BMS 210 selectively switches, on or off, a plurality of relays based on a control of a PRA. For example, a relay 3 is switched on to prevent the battery 220 being divided into battery sections, and a relay 4 is switched on to connect the battery 220 to a single DC charging port. In this example, relays 1 and 2 that connect each of the battery sections into which a battery is divided to the DC charging port are switched off. Since the AC charging port and the motor are not used in this operation, relays 5 and 6 are switched off.

As shown in by the bold line of FIG. 5, the battery 220 is connected to a single DC charging port and charged in a state in which the battery 220 is not divided into sections. For example, when fast charging is determined to be inappropriate based on the state of the battery 220, the battery 220 is slowly charged to enhance the performance of the battery 220 and potentially increase the life of the battery 220.

Figure 6:
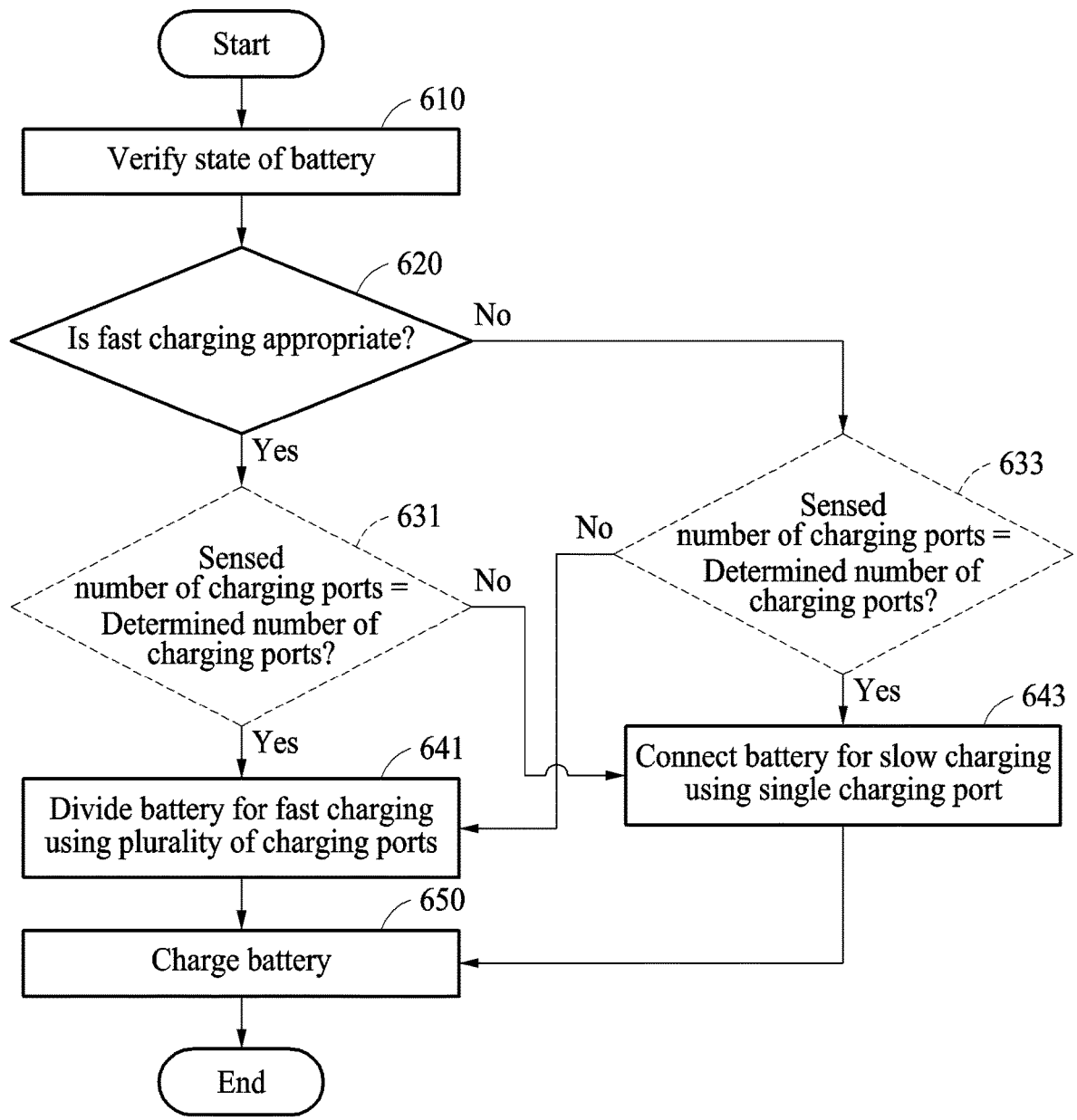
FIG. 6 is a flowchart illustrating an example of a battery charging method.

FIG. 6 is a flowchart illustrating an example of a battery charging method.

The battery charging method of FIG. 6 is performed by, for example, a processor of a battery charging apparatus.

Referring to FIG. 6, in operation 610, the battery charging apparatus verifies the state of a battery. The battery charging apparatus verifies the state of the battery based on any one or any combination of any two or more of a voltage, a current, and a temperature of the battery that are sensed. For example, the state of the battery includes any one or any combination of any two or more of a charging state, a state of life, and a temperature of the battery.

In operation 620, the battery charging apparatus determines whether fast charging of the battery is currently appropriate based on the state of the battery even though available or already initiated.

In an example, when the charging state of the battery is less than a threshold charging state, the battery charging apparatus determines the fast charging to be appropriate. In another example, when the charging state of the battery is greater than or equal to the threshold charging state, the battery charging apparatus determines the fast charging to be inappropriate. In this example, the charging state being greater than or equal to the threshold charging state indicates that a state in which the battery is charged by at least a predetermined level and an adverse effect of fast charging that damages the battery is acceptable, and thus, provides an improvement of the battery charging apparatus 110 over previous charging approaches or corresponding computing devices.

In an example, when the state of life of the battery is greater than or equal to a threshold state of life, the battery charging apparatus determines that fast charging is appropriate and thus, provides an improvement of the battery charging apparatus 110 over previous charging approaches or corresponding computing devices.

In another example, when the state of life of the battery is less than the threshold state of life, the battery charging apparatus determines that fast charging is inappropriate and thus, provides an improvement of the battery charging apparatus 110 over previous charging approaches or corresponding computing devices. In this example, the state of life being less than the threshold state of life indicates a state in which the battery is aged over a predetermined level and the battery would be greatly damaged when the fast charging is used and thus, provides an improvement of the battery charging apparatus 110 over previous charging approaches or corresponding computing devices.

In an example, when a temperature of the battery is greater than or equal to a threshold temperature, the battery charging apparatus determines that fast charging is appropriate. In another example, when the temperature of the battery is less than the threshold temperature, the battery charging apparatus determines that fast charging is inappropriate. When the temperature of the battery is less than the threshold temperature (for example, a room temperature), it may be difficult to perform fast charging of the battery.

As described above, fast charging may be prevented from being inappropriately performed, even though available or already initiated, by determining whether fast charging is currently appropriate based on a state of a battery; thus, effectively preventing a reduction in the life and performance of the battery and providing an improvement of the battery charging apparatus 110 over previous charging approaches or corresponding computing devices.

The battery charging apparatus determines that fast charging is appropriate when the charging state, the state of life and the temperature of the battery satisfy the above-described threshold conditions, or when one or more of the charging state, the state of life and the temperature of the battery satisfy the above-described threshold conditions, and thus, providing an improvement of the battery charging apparatus 110 over previous charging approaches or corresponding computing devices. Also, various schemes based on any one or any combination of any two or more of the charging state, the state of life, and the temperature of the battery are used to determine whether the fast charging is appropriate.

When fast charging is determined to be appropriate, the battery charging apparatus determines to use the plurality of charging ports. When fast charging is determined to be inappropriate, the battery charging apparatus determines to use a single charging port.

In an example, when the fast charging is determined to be appropriate in operation 620, the battery charging apparatus senses the number of charging ports connected to an external power source among charging ports used to charge the battery, and determines whether the sensed number of charging ports is equal to the number of charging ports that is determined based on a determination result of operation 620 in operation 631. In operation 631, the battery charging apparatus determines whether the plurality of charging ports are sensed.

In this example, when the sensed number of charging ports is equal to the determined number of charging ports (that is, when the plurality of charging ports is sensed), the battery charging apparatus divides the battery for fast charging using the plurality of charging ports in operation 641. For example, the battery charging apparatus selectively switches, on or off, a plurality of relays based on a control of a PRA, to divide the battery into the same number of sections as the determined number of charging ports and to connect the sections to corresponding charging ports.

In operation 650, the battery charging apparatus charges each of the sections using the charging ports.

The battery charging apparatus determines at least one of a charging voltage and a charging current based on any one or any combination of any two or more of the determined number of charging ports, an external power source to charge the battery, and a rated input of the battery, and charges the battery with at least one of the charging voltage and the charging current.

For example, the battery charging apparatus determines at least one of the charging voltage and the charging current based on a maximum charging capacity of a charger included in a battery charging station corresponding to the external power source, and based on a number of currently available chargers. The battery charging apparatus identifies a maximum charging capacity of a charger included in each of battery charging stations and the number of currently available chargers, over a wireless or wired network, and induces a user to a battery charging station that is suitable for charging of a battery.

Also, the battery charging apparatus verifies the rated input of the battery and determines at least one of the charging voltage and the charging current based on a charging scheme of the battery. The rated input includes a rated voltage and a rated current of the battery. For example, during fast charging, the battery charging apparatus determines the highest voltage in a rated voltage range of the battery as a charging voltage, and the highest current in a rated current range of the battery as a charging current.

In another example, when the fast charging is determined to be inappropriate in operation 620, the battery charging apparatus senses a number of charging ports connected to the external power source among charging ports used to charge the battery, and determines whether the sensed number of charging ports is equal to the number of charging ports that is determined based on the determination result of operation 620 in operation 633. In operation 633, the battery charging apparatus determines whether a single charging port is sensed.

In this example, when the sensed number of charging ports is equal to the determined number of charging ports (that is, when a single charging port is sensed), the battery charging apparatus prevents a division of the battery for slow charging using a single charging port in operation 643. For example, the battery charging apparatus selectively switches, on or off, the plurality of relays based on a control of the PRA, to prevent a division of the battery.

In operation 650, the battery charging apparatus charges the battery using a single charging port.

The battery charging apparatus determines at least one of a charging voltage and a charging current based on any one or any combination of any two or more of the determined number of charging ports, an external power source to charge the battery, and a rated input of the battery, and charges the battery with at least one of the charging voltage and the charging current. For example, during slow charging, the battery charging apparatus determines an intermediate value or a value less than the intermediate value in a rated voltage range of the battery as a charging voltage, and determines an intermediate value or a value less than the intermediate value in a rated current range of the battery as a charging current.

When the sensed number of charging ports is different from the determined number of charging ports in operation 631, that is, when a single charging port is sensed, operation 643 is performed. For example, although the fast charging is determined to be appropriate, a user desires slow charging rather than fast charging because the battery may be damaged or degraded even slightly due to the fast charging. In this example, when the user connects the external power source to a single charging port, slow charging is performed based on the selection of the user.

When the sensed number of charging ports is different from the determined number of charging ports in operation 633 (that is, when the plurality of charging ports are sensed), operation 641 is performed. For example, although the fast charging is determined to be inappropriate, a user desires fast charging because the user is in a hurry. In this example, when the user connects the external power source to the plurality of charging ports, fast charging is performed based on the selection of the user.

Thus, in operations 631 and 633, preference is given to the user's selection of the battery charging scheme rather than the appropriacy of the fast charging based on the state of the battery. For example, the current drivable range and available use time of the current charge in the battery, and a potential drivable range and available time due to fast charging and slow charging are provided to a user for selecting a suitable charging scheme based on the user's preference or situation.

Depending on examples, the above-described operations 631 and 633 may not be performed. In this example, charging may be performed using a single charging port or the plurality of charging ports determined based on the determination result of operation 620.

Figure 7:
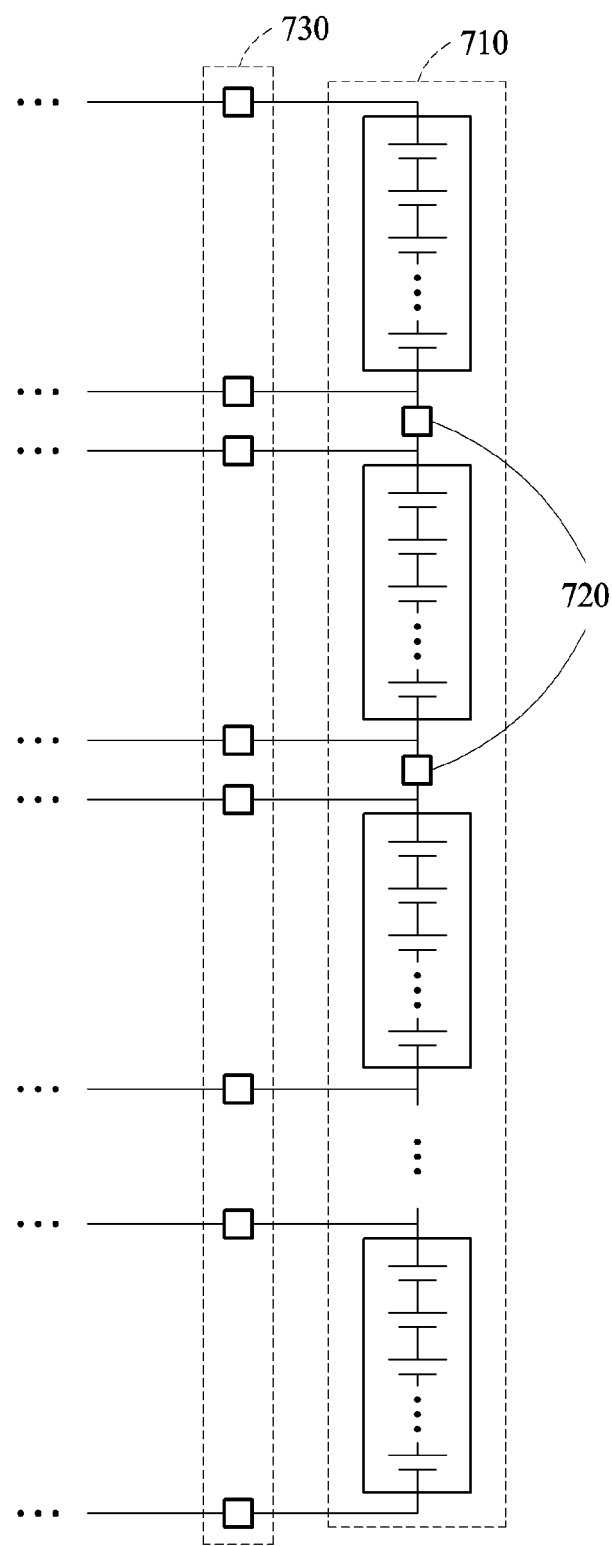
FIG. 7 illustrates an example of a battery.

FIG. 7 illustrates an example of a battery 710.

Referring to FIG. 7, the battery 710 includes a plurality of battery modules. For convenience of description, a battery is divided into two sections in FIGS. 3 through 5, however there is no limitation thereto. For example, the above description is also applicable to an example in which a battery is divided into more than two sections.

The plurality of battery modules in the battery 710 are connected to or disconnected from each other via a relay 720 that is located between two battery modules. In an example, when all relays 720 are switched off based on a control of a PRA, the battery 710 is divided into the same number of sections as the plurality of battery modules. In another example, the relays 720 are selectively switched, on or off, the battery 710 is divided every at least two battery modules.

The battery 710 or the sections of the battery 710 are connected to corresponding charging ports by an operation that selectively switches, on or off, relays 730 to perform slow charging or fast charging.

The battery 710 is assembled using the plurality of battery modules through modularization of the battery 710, or a portion of battery modules in which a failure or malfunction occurs is replaced. Such modularity increases the convenience of use of the battery.

Figure 8:
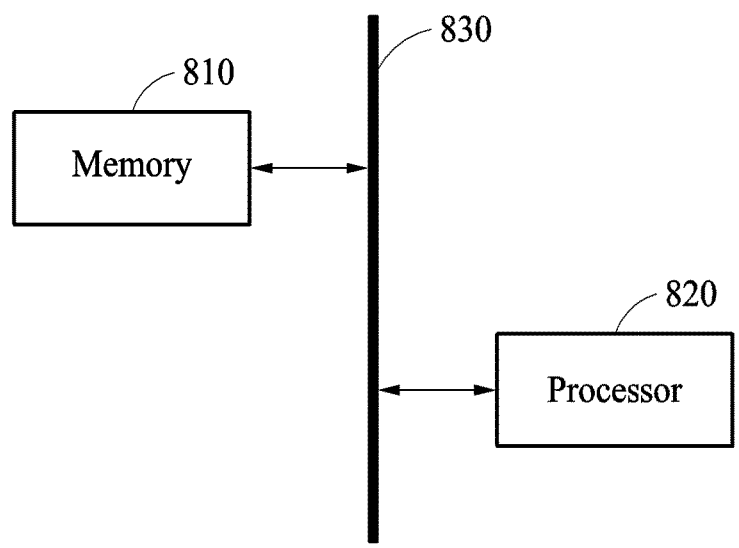
FIG. 8 illustrates an example of a battery charging apparatus.

FIG. 8 illustrates an example of a battery charging apparatus 800.

Referring to FIG. 8, the battery charging apparatus 800 includes a memory 810 and a processor 820. The memory 810 and the processor 820 communicate with each other via a bus 830.

The memory 810 includes a computer-readable instruction. The processor 820 performs the above-described operations in response to the instruction in the memory 810 being executed by the processor 820. The memory 810 is, for example, a volatile memory or a non-volatile memory.

The processor 820 includes an apparatus configured to execute instructions or programs or to control the battery charging apparatus 800. The processor 820 determines a number of charging ports to be used to charge a battery based on a state of the battery, and charges the battery using the charging ports.

The battery charging apparatus 800 is included in, for example, various electronic devices (for example, a vehicle, a walking assistance apparatus, a drone or a mobile terminal), and performs the operations described above with reference to FIGS. 1 through 7. Hereinafter, an example in which the battery charging apparatus 800 is included in a vehicle is described with reference to FIG. 9.

Figure 9:
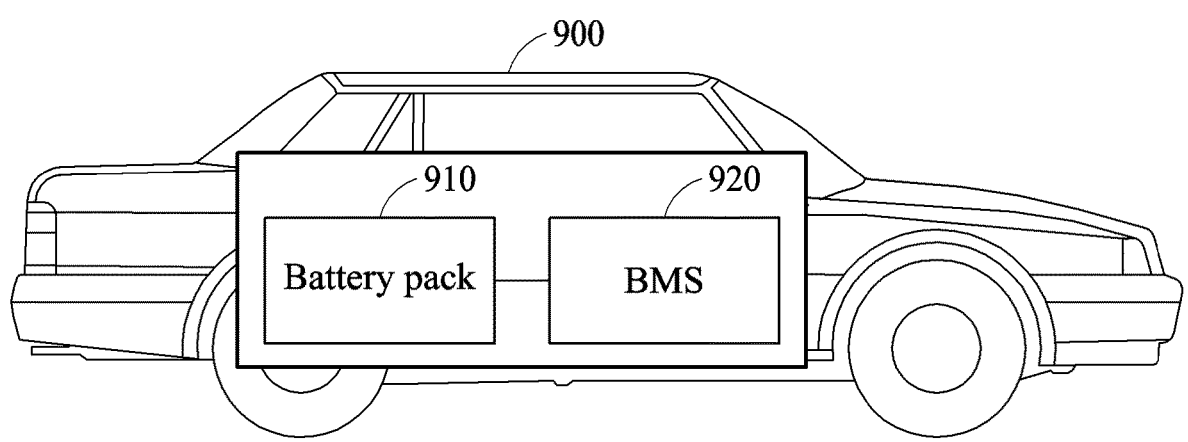
FIG. 9 illustrates an example of a vehicle.

FIG. 9 illustrates an example of a vehicle 900.

Referring to FIG. 9, the vehicle 900 includes a battery pack 910 and a BMS 920. The vehicle 900 uses the battery pack 910 as a power source. The vehicle 900 is, for example, an electric vehicle (EV) or a hybrid vehicle.

The battery pack 910 includes at least one battery module. The battery module includes at least one battery cell.

The BMS 920 monitors whether an abnormality of the battery pack 910 occurs, and prevents the battery pack 910 from being overcharged or overdischarged. Also, the BMS 920 controls a temperature of the battery pack 910 when the temperature of the battery pack 910 exceeds a first temperature (for example, 40° C.) or less than a second temperature (for example, −10° C.). Furthermore, the BMS 920 performs cell balancing so that battery cells included in the battery pack 910 have equal charging states.

For example, the BMS 920 includes a battery charging apparatus. The BMS 920 determines, using the battery charging apparatus, a number of charging ports to be used to charge a battery and charges the battery using the charging ports.

The above description of FIGS. 1 through 8 is also applicable to the example of FIG. 9, and accordingly is not repeated here.

The battery charging apparatus 110, the battery 120 and 220, the charging port 250, the PRA 240, the OBC 260, the motor, the BMS 210 and 920, the battery charging apparatus 800, the memory 810, and the processor 820 in FIGS. 1-9 that perform the operations described in this application are implemented by hardware components configured to perform the operations described in this application that are performed by the hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-9 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:
1. A processor implemented battery charging method, comprising:
 determining a number of charging ports to charge a battery based on a determined state of the battery; and
 charging the battery using the number of charging ports, wherein the charging of the battery comprises, in response to the number of charging ports being determined to be a plural number of charging ports, dividing the battery into a number of battery sections equal to the plural number of charging ports, connecting the battery sections to corresponding charging ports and charging the battery using the plural number of charging ports.

2. The battery charging method of claim 1, wherein the charging of the battery comprises, in response to the number of charging ports being determined to be a single charging port, charging the battery using the single charging port in a state in which the battery is not divided into battery sections.

3. The battery charging method of claim 1, wherein the determining of the number of charging ports comprises:
   determining whether fast charging of the battery is appropriate based on the determined state of the battery;
   in response to the fast charging being determined to be appropriate, determining to use a plural number of charging ports to charge the battery; and
   in response to the fast charging being determined to be inappropriate, determining to use only a single charging port to charge the battery.

4. The battery charging method of claim 1, wherein the determined state of the battery comprises any one or any combination of any two or more of a state of charge (SOC), a state of health (SOH), and a temperature of the battery.

5. The battery charging method of claim 1, wherein the determining of the number of charging ports comprises:
   in response to a charging state of the battery being determined to be less than a threshold charging state, determining to use a plural number of charging ports to charge the battery; and
   in response to the charging state of the battery being determined to be greater than or equal to the threshold charging state, determining to use only a single charging port to charge the battery.

6. The battery charging method of claim 1, wherein the determining of the number of charging ports comprises:
   in response to a state of life of the battery being determined to be greater than or equal to a threshold state of life, determining to use a plural number of charging ports to charge the battery; and
   in response to the state of life of the battery being determined to be less than the threshold state of life, determining to use only a single charging port to charge the battery.

7. A processor implemented battery charging method, comprising:
   determining a number of charging ports to charge a battery based on a determined state of the battery; and
   charging the battery using the number of charging ports, wherein the determining of the number of charging ports comprises:
   in response to a temperature of the battery being determined to be greater than or equal to a threshold temperature, determining to use a plural number of charging ports to charge the battery; and
   in response to the temperature of the battery being determined to be less than the threshold temperature, determining to use only a single charging port to charge the battery.

8. The battery charging method of claim 1, wherein the determining of the number of charging ports comprises:
   sensing a number of available charging ports connected to an external power source among charging ports used to charge the battery; and
   in response to the sensed number of available charging ports being determined to be different from the number of charging ports determined based on the determined state of the battery, changing the sensed number of available charging ports to be equal to the number of charging ports determined based on the determined state of the battery to charge the battery.

9. The battery charging method of claim 1, wherein the charging of the battery comprises:
   in response to the number charging ports being determined to be a plural number of charging ports, fast charging the battery using the plural number of charging ports; and
   in response to the number of charging ports being determined to be a single charging port, slowly charging the battery using only the single charging port.

10. The battery charging method of claim 1, wherein
    the battery comprises a plurality of battery modules, and
    the plurality of battery modules are selectively connected to or disconnected from each other based on the determined number of charging ports.

11. The battery charging method of claim 1, wherein the charging of the battery comprises:
    charging the battery with either one or both of a charging voltage and a charging current that are determined based on any one or any combination of any two or more of the determined number of charging ports, an external power source to charge the battery, and a rated input of the battery.

12. A non-transitory computer-readable storage medium storing instructions that, when executed by a processor, cause the processor to perform the battery charging method of claim 1.

13. A battery charging apparatus comprising:
    a processor; and
    a memory comprising at least one instruction that is executable by the processor,
    wherein in response to the at least one instruction being executed by the processor, the processor is configured to:
    determine a number of charging ports to charge a battery based on a determined state of the battery; and
    charge the battery using the charging ports,
    wherein in response to the number of charging ports being determined to be a plural number of charging ports, the processor is further configured to:
    divide the battery into a number of battery sections equal to the plural number of charging ports;
    connect the battery sections to corresponding charging ports; and
    charge the battery using the plural number of charging ports.

14. The battery charging apparatus of claim 13, wherein in response to the number of charging ports being determined to be a single charging port, the processor is further configured to charge the battery in a state in which the battery is not divided into battery sections.

15. The battery charging apparatus of claim 13, wherein the processor is further configured to:
    determine whether fast charging of the battery is appropriate based on the determined state of the battery;
    in response to the fast charging being determined to be appropriate, determine to use a plural number of charging ports; and
    in response to the fast charging being determined to be inappropriate, determine to use only a single charging port.

16. The battery charging apparatus of claim 13, wherein the determined state of the battery comprises any one or any combination of any two or more of a state of charge (SOC), a state of health (SOH), and a temperature of the battery.

17. The battery charging apparatus of claim 13, wherein the processor is further configured to:
- sense a number of charging ports connected to an external power source among charging ports used to charge the battery; and
- in response to the sensed number of charging ports being determined to be different from the number of charging ports determined based on the determined state of the battery, changing the sensed number of charging ports to equal a number of charging ports used to charge the battery.

18. The battery charging apparatus of claim 13, wherein the battery comprises a plurality of battery modules, and the plurality of battery modules are connected to or disconnected from each other based on the determined number of charging ports.

* * * * *